US005454003A

United States Patent [19]
Murata et al.

[11] Patent Number: 5,454,003
[45] Date of Patent: Sep. 26, 1995

[54] GAS LASER OSCILLATOR

[75] Inventors: Takaaki Murata, Hisai; Kiyohisa Terai, Yokohama; Tohoru Tamagawa, Machida; Hirokatsu Suzuki, Fuchu, all of Japan

[73] Assignee: Kabushiki Kaisha Toshiba, Kanagawa, Japan

[21] Appl. No.: 329,663

[22] Filed: Oct. 26, 1994

Related U.S. Application Data

[63] Continuation of Ser. No. 225,090, Apr. 8, 1994, abandoned, which is a continuation of Ser. No. 920,611, Jul. 27, 1992, abandoned.

[30] Foreign Application Priority Data

Jul. 29, 1991 [JP] Japan ................... 3-187995

[51] Int. Cl.$^6$ ................................... H01S 3/00
[52] U.S. Cl. ................................. 372/37; 372/82
[58] Field of Search ................... 372/37, 87, 82, 372/58, 59, 56, 37

[56] References Cited

U.S. PATENT DOCUMENTS

| | | | |
|---|---|---|---|
| 4,004,249 | 1/1977 | Kikuchi | 372/37 |
| 4,597,086 | 6/1986 | Kimbara | 372/82 |
| 4,672,618 | 6/1987 | Wijntjes et al. | 372/37 |
| 4,730,334 | 3/1988 | Collins et al. | 372/37 |
| 4,755,999 | 7/1988 | Macken | 372/37 |
| 4,779,279 | 10/1988 | Brown | 372/37 |
| 4,785,458 | 11/1988 | Kuzumoto et al. | 372/56 |
| 4,811,355 | 3/1989 | Krueger et al. | 372/37 |
| 4,910,742 | 3/1993 | Meinhardt | 372/37 |
| 4,935,937 | 6/1990 | Yamazaki | 372/59 |
| 5,048,032 | 9/1991 | Ekstrand et al. | 372/82 |
| 5,060,238 | 10/1991 | Karube et al. | 372/59 |

OTHER PUBLICATIONS

H. J. J. Seguin et al., High-power laser discharge stabilization with magnetic fields, Appln. Phys. Lett., 37 (2), P130 (1980).

*Primary Examiner*—Léon Scott, Jr.
*Attorney, Agent, or Firm*—Limbach & Limbach

[57] ABSTRACT

A transverse type gas laser oscillator includes a receptacle for containing a gas as a laser medium, a pair of electrodes disposed to be parallel to each other on opposite sides of the receptacle so that an electric field is established for generation of AC discharge when a high-frequency voltage is applied to them, and a pair of permanent magnets disposed so as to form a magnetic field intersecting a direction of the electric field established between the electrodes, or a pair of coils excited by a DC voltage. Consequently, ionization of the gas excited by the electric field is increased by the magnetic field.

10 Claims, 8 Drawing Sheets

GAS LASER OSCILLATOR

This is a continuation of application Ser. No. 08/225,090, filed on Apr. 8,1994 now abandoned Jan. 23, 1995, which is a continuation of Ser. No. 07/920,611, filed Jul. 27, 1992 now abandoned May 19, 1994.

BACKGROUND OF THE INVENTION

1. Field of the Invention

This invention relates to a gas laser oscillator which generates an AC discharge by a high-frequency electric field in a space filled with a laser medium, thereby generating laser beams.

2. Description of the Prior Art

A gas serving as a laser medium is circulated by a blower through a radiator in an enclosed receptacle in gas laser resonators of the above-described type. A pair of electrodes are disposed so that a high-frequency electric field is established in a portion of a flow pass along which the gas is circulated. When a high-frequency voltage is applied across the electrodes, the gas is excited by the high-frequency electric field established between the electrodes such that laser beams are generated in a direction perpendicular to that of the high-frequency electric field.

There are the following problems to be solved in the above-described gas laser oscillator. That is, the physical structure of the gas discharge caused by the electric field mainly consists of a positive column and an ion sheath both distributed vertically between the electrodes. Electric power in the positive column contributes to the laser excitation but an electric power in the ion sheath does not contribute to the laser excitation. When an AC discharge frequency or a frequency of the high-frequency voltage applied across the electrodes is high, a current flowing in the ion sheath is mainly composed of a displacement current. In this case, an electric power loss is small. When the AC discharge frequency is low, however, the current flowing in the ion sheath contains a conduction current in addition to the displacement current, which results in a loss of the electric power. Consequently, an amount of the conduction current component in the electric current flowing in the ion sheath is increased as the frequency of the AC discharge current is lowered, which results in the increase in the electric power loss. As a ratio of the electric power loss in the ion sheath to the electric power consumed in the positive column is increased, an amount of consumed electric power not contributing to the laser excitation is relatively increased and accordingly, an efficiency of laser oscillation is reduced.

Conventionally, the following two countermeasures have been employed for restraining the power loss in the ion sheath: (1) increasing the positive column voltage and more specifically, increasing the pressure applied to the laser gas and (2) increasing the AC discharge frequency so that the power loss is reduced in the ion sheath. In the case of countermeasure (1), a small-signal gain which is one of fundamental parameters for the laser excitation is lowered and accordingly, the reflectance of an output mirror composing an optical oscillator needs to be increased. However, when the reflectance of the output mirror is increased, the quality of the laser beam is reduced by thermal deformation of the lens.

On the other hand, in the countermeasure (2), the AC discharge frequency needs to be increased to a high frequency above several mega Hertz. Generally, an amplifier system is employed in the case of the power supply at the frequency of several mega Hertz or above. Accordingly, the power supply efficiency is 70% even in the case of an amplifier system of the class C. However, a switching power supply system can be employed when the AC discharge frequency is reduced below several mega Hertz. In this case, the power supply efficiency of 90% can be achieved.

SUMMARY OF THE INVENTION

Therefore, an object of the present invention is to provide a gas laser oscillator wherein the laser excitation can be achieved at high-level efficiency under the condition that the pressure of the gas as the laser medium is maintained at a conventional value and the AC discharge frequency takes a relatively low value of several mega hertz or below.

In one aspect, the present invention provides an RF discharge type gas laser oscillator wherein a high-frequency voltage is applied to electrodes, the oscillator comprising a receptacle for containing a laser medium, at least one pair of electrodes disposed to be parallel to each other on opposite sides of the receptacle so that an electric field is established in a predetermined space filled with the laser medium in the receptacle when the high-frequency voltage is applied to the electrodes, the electric field having a direction approximately perpendicular to a direction of flow of laser medium and magnetic field establishing means for establishing a magnetic field intersecting a direction of the electric field established between the electrodes.

In accordance with the above-described gas laser oscillator, collision of electrons is enhanced by an effect of the magnetic field formed in the ion sheath as a laser non-excitation space in the direction intersecting that of the electric field established between the electrodes, which direction will be referred to as "transverse direction." Consequently, since high-energy electrons are trapped by the magnetic field, ionization is intensified, which lowers the voltage of the ion sheath and reduces the power loss in the ion sheath. Furthermore, the collision of the electrons is intensified by the transverse magnetic field in the voltage of the positive column serving as the laser excitation space. Consequently, the electric power is effectively consumed for the laser excitation. Differing from the case where the gas pressure is increased, the small-signal gain is not reduced and accordingly, the reflectance of the output mirror need not be increased and the reduction of the laser-beam quality due to the thermal deformation of the lens can be prevented. Consequently, wasteful loss of the electric power not contributing to the laser excitation is reduced since the electric power loss in the ion sheath as the laser non-excitation space can be rendered small relative to the electric power consumption in the positive column as the laser excitation space. Consequently, the laser oscillating efficiency can be prevented from being reduced even in the use of the AC discharge frequency of several mega Hertz or below.

In another aspect, the invention provides an RF discharge type gas laser oscillator wherein a high-frequency voltage is applied to electrodes, the oscillator comprising a receptacle for containing a gas of laser medium and at least one pair of permanent magnets disposed to be parallel to each other along opposite sides of the receptacle, with a predetermined space filled with the laser medium interposed therebetween, the permanent magnets establishing a magnetic field in the predetermined space and establishing an electric field when the high-frequency voltage is applied thereto.

In further another aspect, the invention provides an RF discharge type gas laser oscillator wherein a high-frequency voltage is applied to electrodes, the oscillator comprising a generally cylindrical receptacle for containing a gas of laser medium, the receptacle being formed from a material conducting a high-frequency voltage, an electrode disposed in the receptacle to be parallel to an inner peripheral surface of the receptacle so that the high-frequency voltage is applied across the electrode and the receptacle such that an electric field is established in the receptacle and a generally cylindrical coil disposed around an outer periphery of the receptacle so as to form a double cylinder with the receptacle, the coil being excited by an electric current.

Other objects of the present invention will become obvious upon understanding of the illustrative embodiments about to be described. Various advantages not referred to herein will occur to one skilled in the art upon employment of the invention in practice,

BRIEF DESCRIPTION OF THE DRAWINGS

Embodiments of the present invention will be described with reference to the accompanying drawings in which.

DESCRIPTION OF THE PREFERRED EMBODIMENTS

Figure 1:
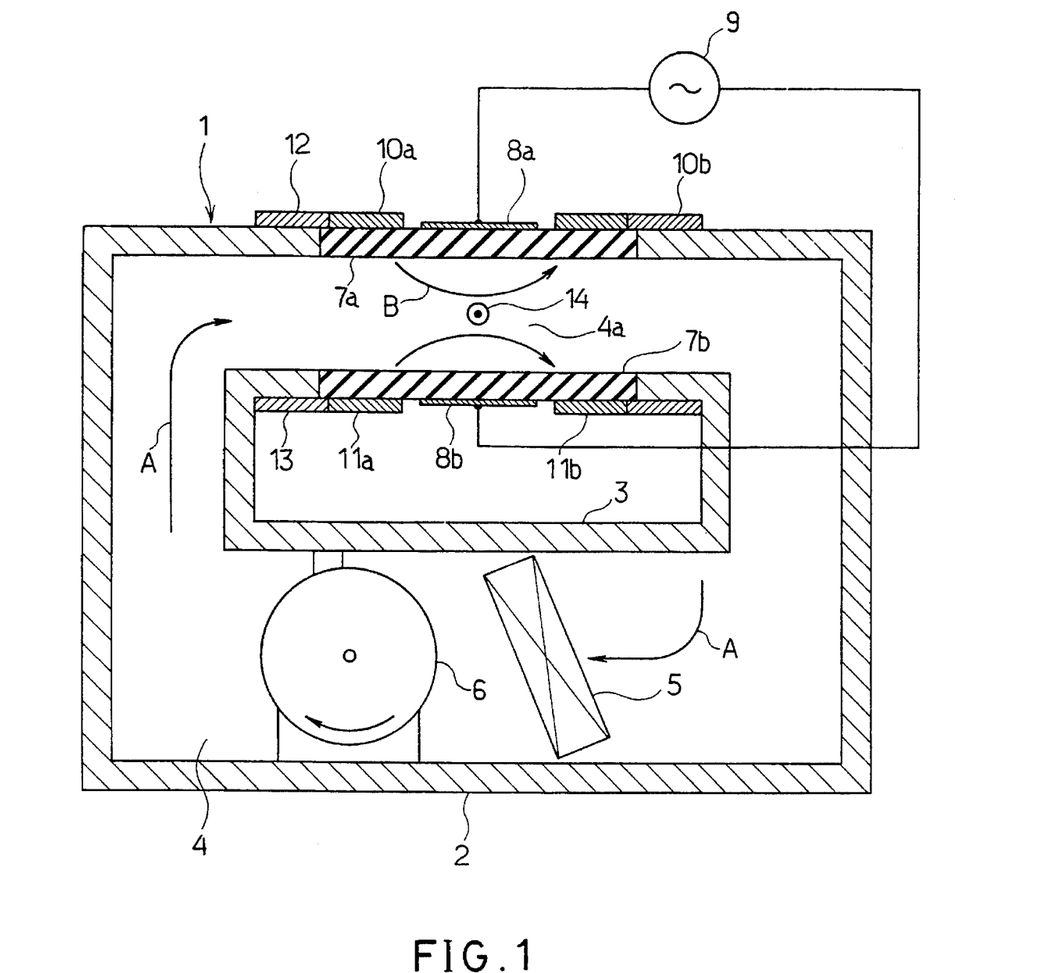
FIG. 1 is a longitudinally sectional view of a transverse type gas laser oscillator according to a first embodiment of the present invention.
Figure 2:
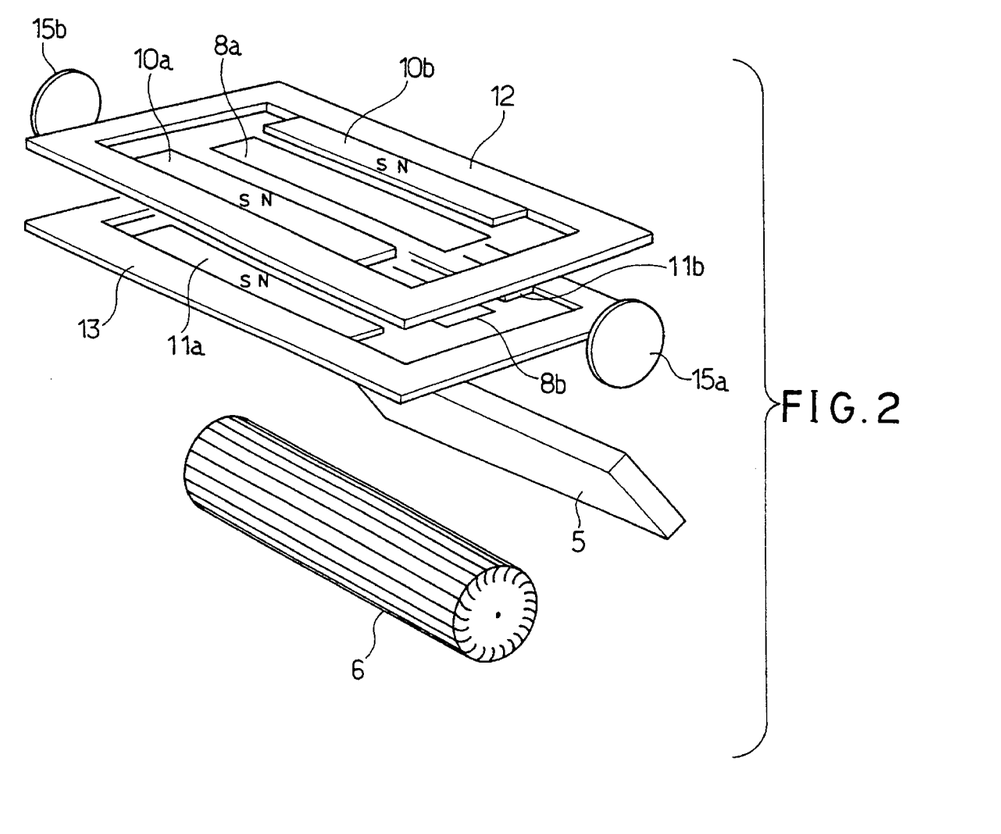
FIG. 2 is a perspective view of the gas laser showing arrangement of parts except for the receptacle.

A first embodiment wherein the present invention has been applied to a transverse type gas laser oscillator will be described with reference to FIGS. 1 and 2. A receptacle 1 containing a gas serving as a laser medium has a circulation space 4 defined by a first outer wall 2 and a second outer wall 3. The receptacle 1 is also provided with a blower 6 driven for circulating the laser gas in a direction of arrow A through a radiator 5 in the circulation space 4. The circulation space 4 includes a discharge space 4a. The first and second outer walls 2, 3 include respective portions opposite to each other with the discharge space 4a interposed therebetween. These portions of the outer walls 2, 3 comprise dielectric electrodes 7a and 7b respectively. The dielectric electrodes 7a, 7b are composed of a dielectric material conducting a high-frequency current, such as ceramics and respective dielectric plates 8a and 8b to which a high-frequency voltage of 1 to 2 kV from a high-frequency power supply 9 is applied at a radio frequency of several MHz, for example. Consequently, a high-frequency electric field is established in the discharge space 4a in a direction in which the electrode plates 8a, 8b are opposite to each other. This high-frequency electric field causes an AC discharge to take place in an atmosphere of the laser gas in the discharge space 4a. Consequently, the laser gas is excited such that laser beams 14 are generated in a direction perpendicular to the direction of the electric field or perpendicular to the space of the drawing paper of FIG. 1. Mirrors 15a and 15b as shown in FIG. 2 composes an optical resonator. The construction as far as described above is the same as that of the conventional transverse type gas laser oscillator except for the value of voltage applied across the electrodes and the value of frequency of the applied voltage.

Magnetic flux generating members or a pair of permanent magnets 10a and 10b serving as magnetic field establishing means are disposed on the outside of the receptacle 1, with the one electrode plate 8a interposed therebetween, so that the permanent magnets correspond to the discharge space 4a. Another pair of permanent magnets 11a and 11b are disposed on the outside of the receptacle 1, with the other electrode plate 8b interposed therebetween. Furthermore, a yoke member 12 is disposed on the outside of the receptacle 1 so as to surround the pair of permanent magnets 10a, 10b. The yoke member 12 is formed from a material with high permeability so as to provide a magnetic closed loop for the permanent magnets 10a, 10b. In the same manner, another yoke member 13 is disposed on the outside of the receptacle 1 so as to surround the other pair of permanent magnets 11a, 11b. In this case, the one pair of the permanent magnets 10a, 10b are disposed so that different polarities are opposite to each other with the electrode plate 8a placed therebetween with respect to the poles of the magnets 10a, 10b. The other pair of permanent magnets 11a, 11b are disposed in the same manner so that different polarities are opposite to each other with the electrode plate 8b placed therebetween with respect to the south and north poles. Consequently, a magnetic field is established in the discharge space 4a in the receptacle 1 so that magnetic fluxes from the permanent magnets 10a, 10b, 11a, 11b pass in a direction intersecting the direction of the electric field, as is shown by arrow B in FIG. 1. The magnetic flux density becomes higher at a position closer to the surfaces of the dielectric electrodes 7a, 7b in the discharge space 4a. The established magnetic field facilitates ionization in an ion sheath induced in the vicinity of the dielectric electrodes 7a, 7b and increases collision of electrons in a positive column. Consequently, the loss in the electric power is reduced.

Figure 3:
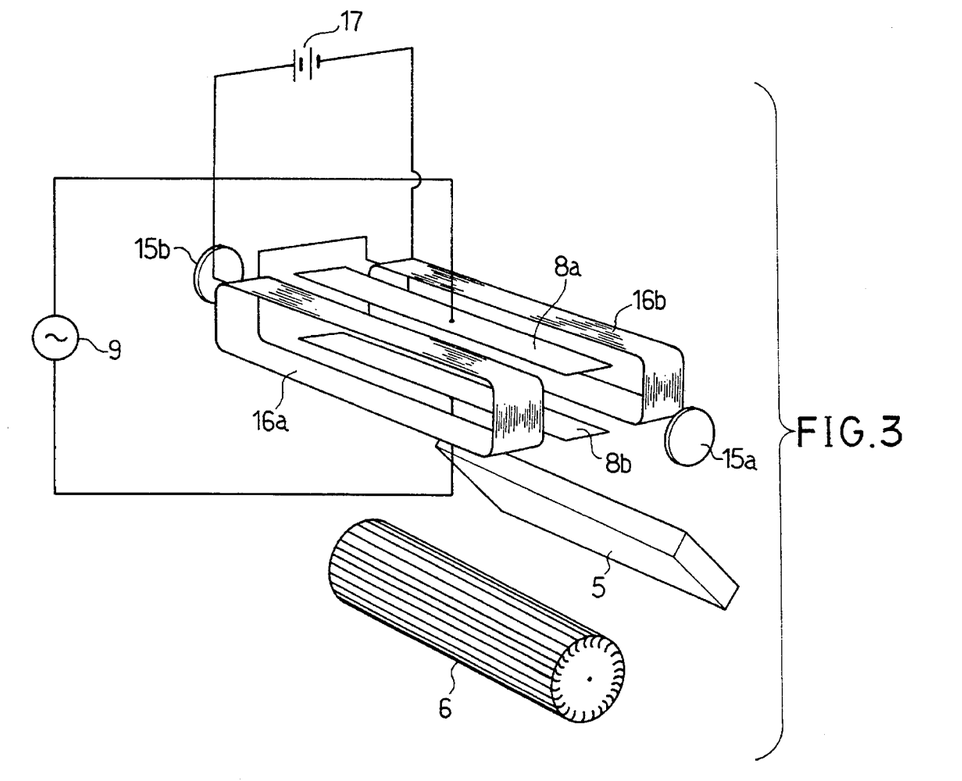
FIG. 3 is a view similar to FIG. 2 showing a second embodiment of the invention.

FIG. 3 illustrates a second embodiment of the invention. The same parts as those in FIG. 2 are labeled by the identical reference numerals in FIG. 3. A first coil 16a generates a DC magnetic field when a DC voltage from a DC power supply 17 is applied to it. The first coil 16a is disposed as the magnetic flux generating member instead of the permanent magnets 10a, 11a in the previous embodiment. A second coil 16b is also disposed instead of the permanent magnets 10b, 11b.

Figure 4:
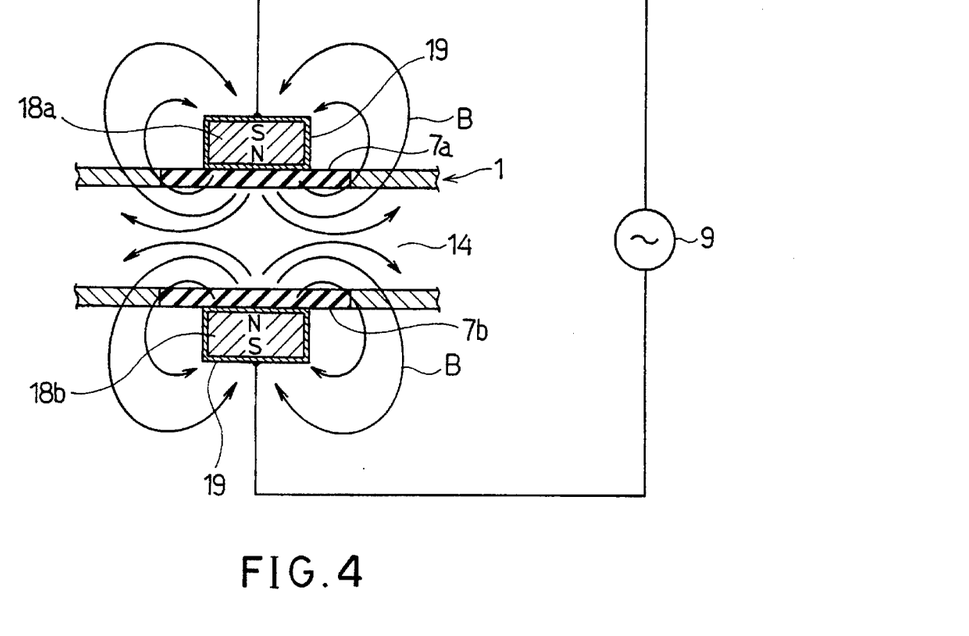
FIG. 4 is a sectional view of the gas laser oscillator in accordance with a third embodiment of the invention.

FIG. 4 illustrates a third embodiment. Permanent magnets 18a and 18b are employed instead of the electrode plates 8a, 8b in FIG. 1. The permanent magnets 18a and 18b are disposed so that one polarity of each magnet is opposite to the same polarity of the other magnet with the discharge space 4a interposed therebetween. In order that the permanent magnets 18a, 18b are also effective as the electrodes, a non-magnetic conductive layer 19 is formed on the surface of each of the permanent magnets 18a, 18b. Each non-magnetic conductive layer 19 is formed from gold, silver, aluminum or the like. The thickness of each layer 19 is determined so as to correspond to the depth at which a skin effect due to the frequency of the applied voltage. In this case, a resistance loss and an eddy current loss in the permanent magnets are prevented by the non-magnetic conductive layer 19.

Figure 5:
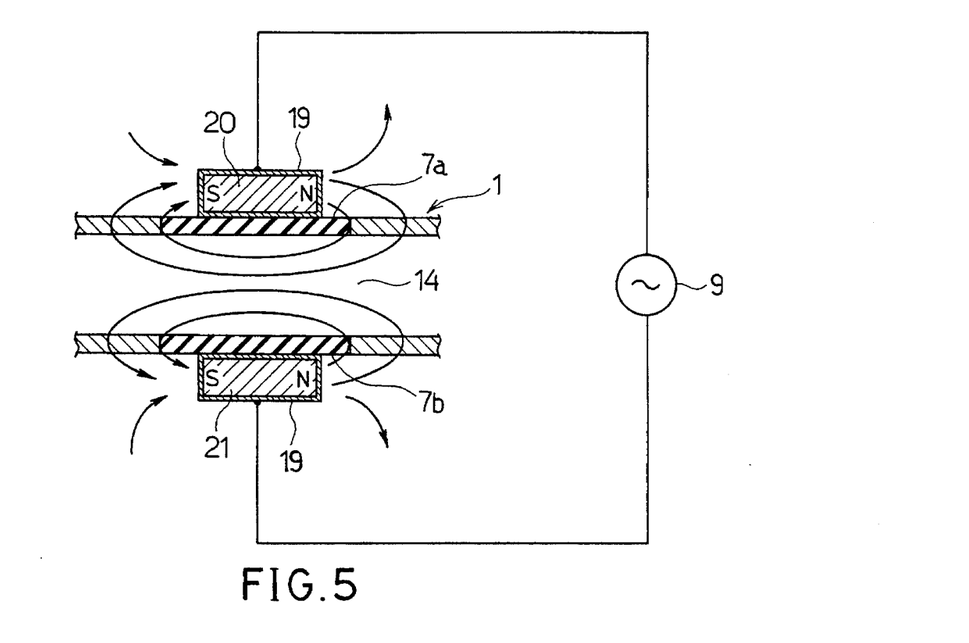
FIG. 5 is a view similar to FIG. 4 showing a fourth embodiment of the invention.
Figure 6:
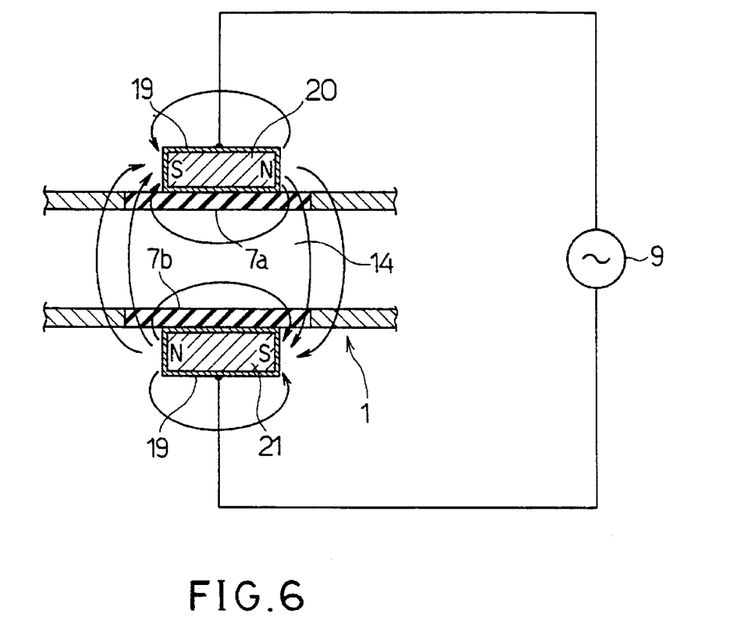
FIG. 6 is a view similar to FIG. 4 showing a fifth embodiment of the invention.

FIGS. 5 and 6 illustrate fourth and fifth embodiments respectively. In the fourth embodiment, permanent magnets 20 and 21 are oppositely disposed so as to have the same polarity at both ends along the respective dielectric electrodes 7a, 7b. That is, the south poles of the magnets 20, 21 are positioned in the left-hand side and the north poles in the right-hand side, as viewed in FIG. 5. In the fifth embodiment, the permanent magnets 20, 21 are oppositely disposed so as to have different polarity at both ends along the respective electrodes 7a, 7b. That is, the pole of the magnet 20 and the north pole of the magnet 21 are positioned in the left-hand side and the north pole of the magnet 20 and the south pole of the magnet 21 in the right-hand side, as viewed in FIG. 6.

Figure 7:
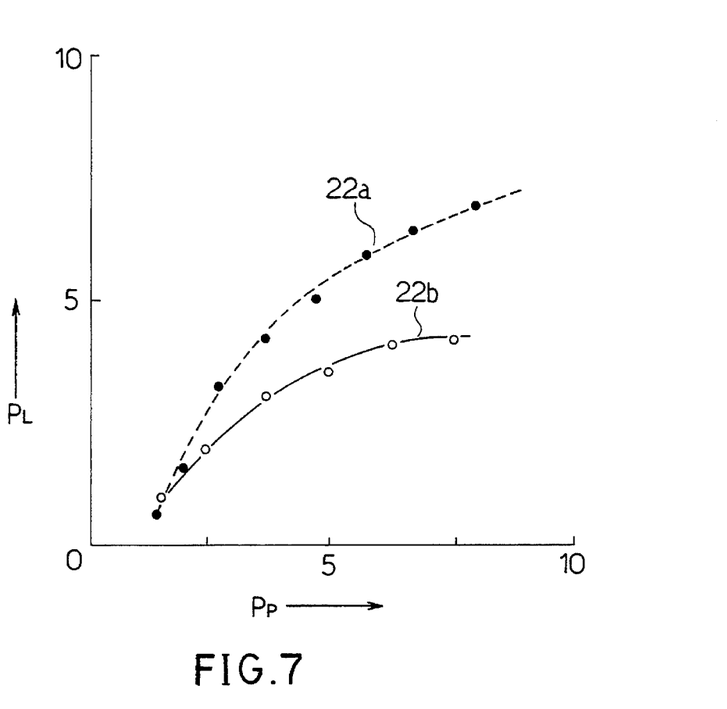
FIG. 7 is a graph showing experimental data obtained from the gas laser oscillator of the fourth embodiment in FIG. 5.

FIG. 7 shows experimental results regarding the gas laser oscillator of the fourth embodiment. The axis of abscissas represents an input power $P_p$ supplied across the dielectric electrodes and the axis of ordinates a laser output $P_L$. A curve 22a represents data obtained from an experiment carried out in the condition that a transverse magnetic field (300 gauss) has been established in the discharge space 4a at the gas pressure of 30 torr in the case of the construction shown in FIG. 5. Another curve 22b represents data obtained from an experiment in which conventional electrode plates are employed instead of the permanent magnets 20, 21 in the construction shown in FIG. 5. In comparison between the curves 22a, 22b, the laser oscillating efficiency is higher in the condition that the transverse magnetic field is established in the discharge space 4a than in the condition that no transverse magnetic field is established.

Figure 8:
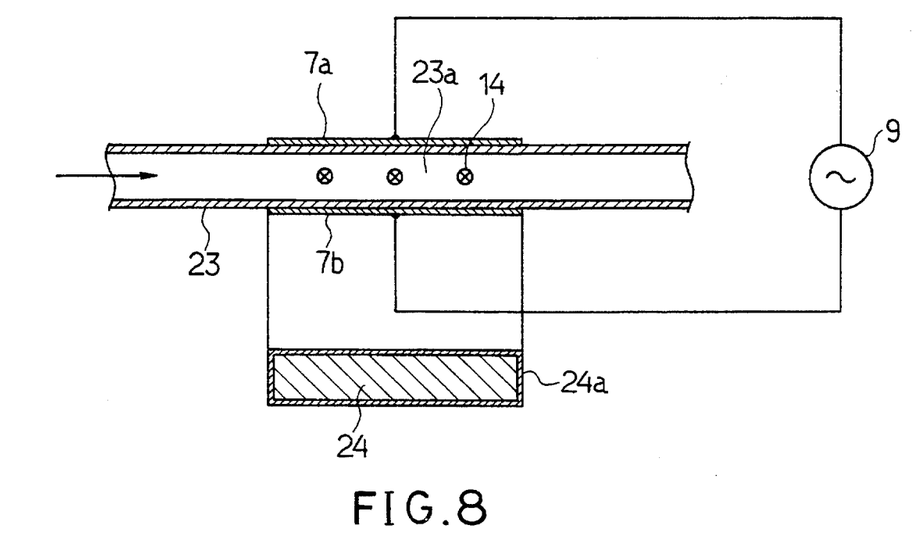
FIG. 8 is a longitudinally sectional side view of the transverse type gas laser oscillator in accordance with a sixth embodiment.
Figure 9:
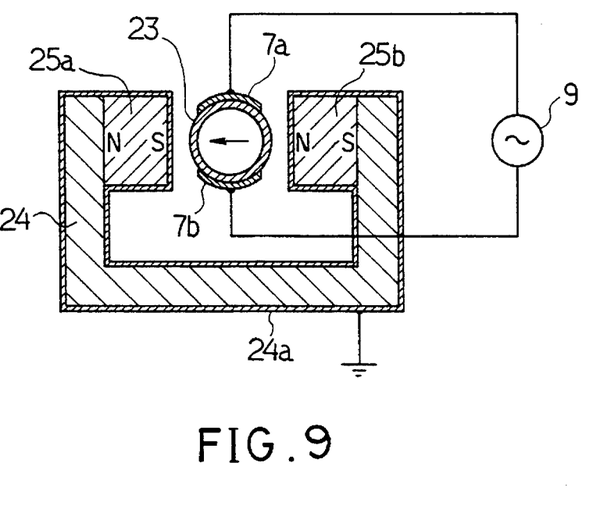
FIG. 9 is a longitudinally sectional front view of the gas laser oscillator shown in FIG. 8.

FIGS. 8 and 9 illustrate a sixth embodiment. A discharge tube 23 is mounted for providing a discharge space 23a as a part of the circulation space 4. A pair of permanent magnets 25a and 25b coupled together by a yoke 24 are oppositely disposed so as to have different polarity at the respective ends with the discharge tube 23 interposed therebetween. That is, the south pole of the magnet 25a and the north pole of the magnet 25b are positioned at the discharge tub side. The north pole of the magnet 25a and the south pole of the magnet 25b abut the yoke 24. An electromagnetically-shielding conductive layer 24a is formed on the outer peripheries of the yoke 24 and permanent magnets 25a, 25b.

Figure 10:
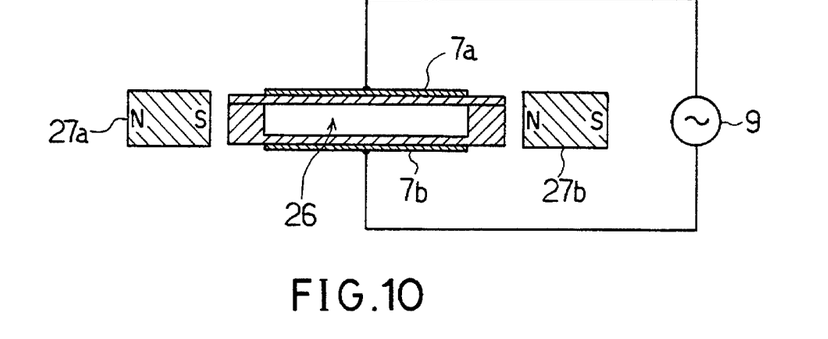
FIG. 10 is a longitudinally sectional view of a slab type gas laser oscillator in accordance with a seventh embodiment.
Figure 11:
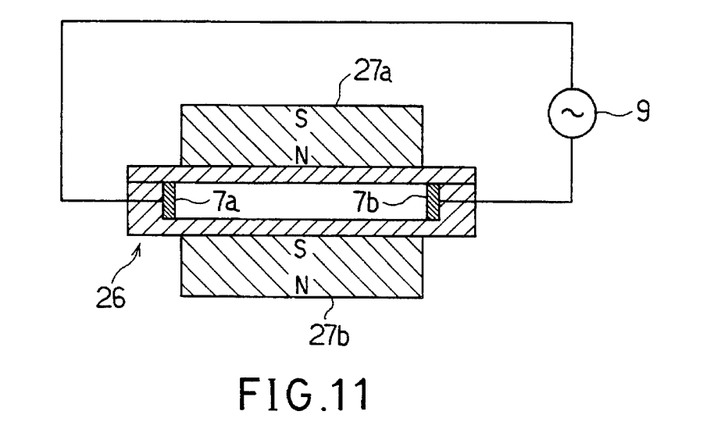
FIG. 11 is a view similar to FIG. 10 showing an eighth embodiment.
Figure 12:
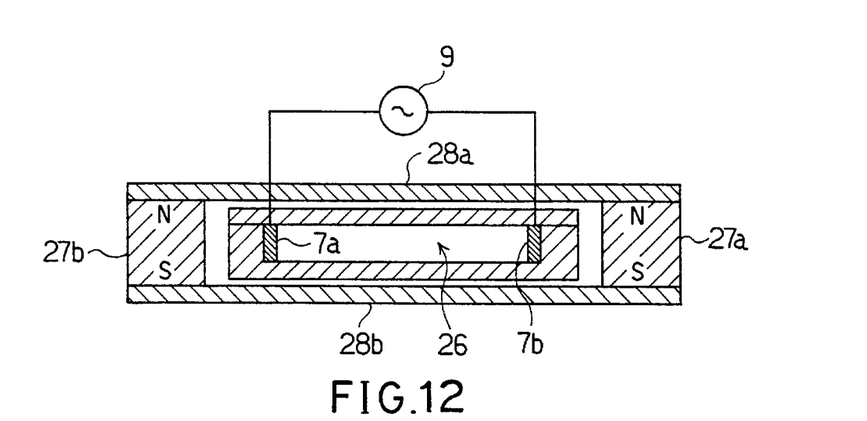
FIG. 12 is a view similar to FIG. 10 showing a ninth embodiment.

FIGS. 10, 11 and 12 illustrate seventh, eighth and ninth embodiments respectively. In these embodiments, the invention is applied to a slab type laser oscillator in which the gas as the laser medium is contained in a receptacle 26 formed from a dielectric material and an optical resonator is disposed in the direction of the depth of the receptacle 26. In the seventh embodiment, the dielectric electrodes 7a, 7b are disposed on upper and lower sides of the receptacle 26 respectively. The permanent magnets 27a, 27b are placed at both end sides of the receptacle 26 along the lengthwise direction thereof respectively. In the eighth embodiment, the dielectric electrodes 7a, 7b are disposed at both end sides of the receptacle 26 within the interior thereof respectively. The permanent magnets 27a, 27b are disposed on the upper and lower sides of the receptacle 26 along the lengthwise direction thereof respectively. In the ninth embodiment, the dielectric electrodes 7a, 7b are also disposed at both end sides of the receptacle within the interior thereof respectively. The permanent magnets 27a, 27b are positioned at both end sides of the receptacle 26 along the lengthwise direction thereof respectively. A pair of yokes 28a and 28b are provided along the lengthwise direction of the receptacle 26 so that the magnets 27a, 27b and the receptacle 26 are interposed therebetween. In this case, the north pole of each magnet is coupled to the upper yoke 28a and the south pole of each magnet is coupled to the lower yoke 28b such that the yokes 28a, 28b positively produces leakage fluxes in a direction perpendicular to the direction of the electric field in the receptacle 26.

Figure 13:
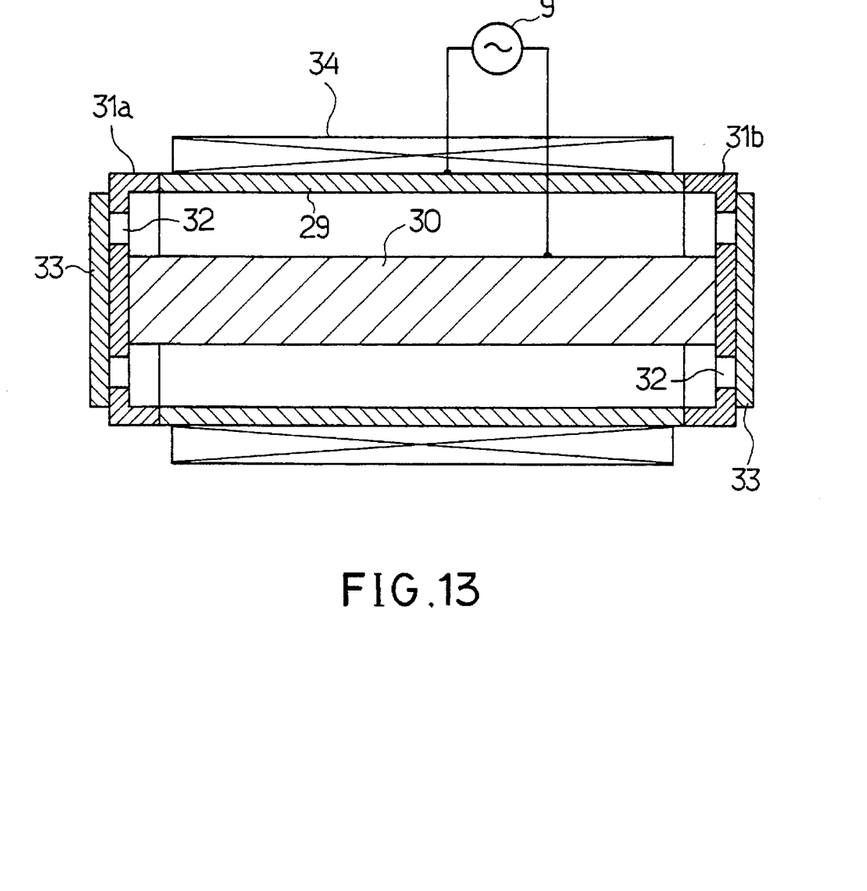
FIG. 13 is a longitudinally sectional view of the gas laser oscillator in accordance with a ninth embodiment of the invention.
Figure 14:
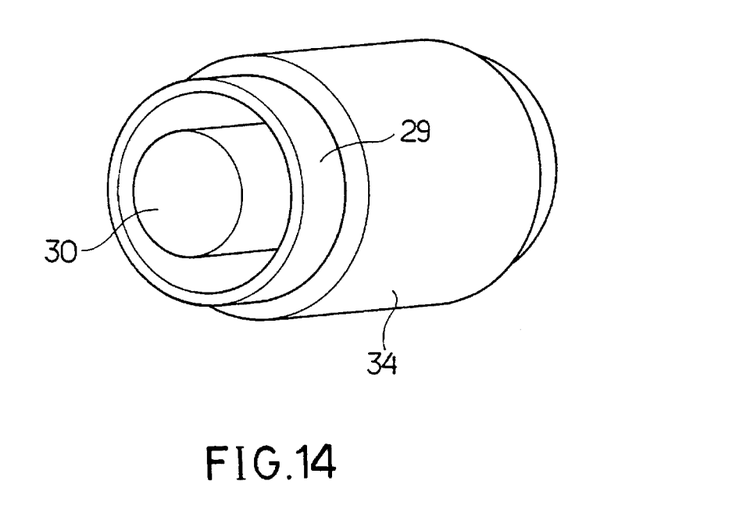
FIG. 14 is a perspective view of the gas laser oscillator shown in FIG. 13 with a cover eliminated.

FIGS. 13 and 14 illustrate a tenth embodiment. A cylindrical receptacle 29 for containing the laser gas is formed from a material conducting the high-frequency voltage so as to serve as one of the electrodes. The other bar-shaped center electrode 30 formed from a dielectric material is provided in the center of the receptacle 29. The cylindrical receptacle 29 has both open ends closed by lids 31a and 31b respectively. Each of the lids 31a, 31b has a number of apertures 32. Mirrors 33 for the optical resonance are disposed on the outside of the lids 31a, 31b for receiving the light beams through the apertures 32, respectively. A cylindrical coil 34 is provided around the cylindrical receptacle 29 to form a double cylinder. When excited by a DC current, the coil 34 generates a magnetic flux in a direction intersecting perpendicularly to the direction of an electric field established between the receptacle 29 and the bar-shaped center electrode 30.

Although the coils 16a, 16b and 34 are excited by the DC current in the foregoing embodiments, they may be excited by an AC current.

The foregoing disclosure and drawings are merely illustrative of the principles of the present invention and are not to be interpreted in a limiting sense. The only limitation is to be determined from the scope of the appended claims.

We claim:

1. A RF discharge type gas laser oscillator wherein a high-frequency voltage is applied to a pair of electrodes, comprising:

a) a receptacle for containing a gas laser medium;

b) a pair of electrodes disposed parallel to each other on opposite sides of the receptacle so that an electric field is established in a predetermined space filled with the laser medium in the receptacle when the high-frequency voltage is applied to the electrodes, wherein the electric field has a direction approximately perpendicular to a direction of flow of the laser medium; and c) magnetic field establishing means for establishing a magnetic field intersecting a direction of the electric field established between the electrodes, wherein the electric and magnetic fields act to increase collisions between electrons in the laser medium and increase ionization of the laser medium, thereby causing a more efficient transfer of the power produced by a source of the high frequency voltage into the gas laser medium.

2. The RF discharge type gas laser oscillator of claim 1, wherein the magnetic field establishing means comprises a pair of permanent magnets.

3. The RF discharge type gas laser oscillator of claim 1, wherein the magnetic field establishing means comprises a pair of coils excited by an electric current.

4. The RF discharge type gas laser oscillator of claim 1, wherein the magnetic field establishing means comprises two pairs of permanent magnets disposed at both sides of the electrodes respectively.

5. The RF discharge type gas laser oscillator of claim 1, wherein the magnetic field establishing means comprises a pair of magnetic flux generating members disposed parallel to each other along the opposite sides of the receptacle in a direction intersecting the direction in which the electrodes are disposed.

6. A RF discharge type gas laser oscillator wherein a high-frequency voltage is applied to a pair of electrodes, comprising:

a) a receptacle for containing a gas laser medium; and b) a pair of permanent magnets disposed parallel to each other along opposite sides of the receptacle, with a predetermined space filled with the laser medium interposed therebetween, the permanent magnets establishing a magnetic field in the predetermined space and establishing an electric field when the high-frequency voltage is applied to the permanent magnets, wherein the electric and magnetic fields act to increase collisions between electrons in the laser medium and increase ionization of the laser medium, thereby causing a more efficient transfer of the power produced by a source of the high frequency voltage into the gas laser medium.

7. The RF discharge type gas laser oscillator of claim 6, wherein each permanent magnet has an electrically conductive surface layer formed from a non-magnetic electrically conductive material.

8. A RF discharge type gas laser oscillator wherein a high-frequency voltage is applied to a pair of electrodes, comprising:

a) a generally cylindrical receptacle for containing a gas laser medium, the receptacle having an inner surface and an outer surface and being formed from a material capable of conducting a high-frequency voltage;

b) an electrode disposed in the receptacle parallel to the inner surface of the receptacle such that an electric field is established in the receptacle when the high-frequency voltage is applied across the electrode and the receptacle; and c) a generally cylindrical coil disposed around the outer surface of the receptacle so as to form a double cylinder with the receptacle, wherein the coil is excited by an electric current, forming a magnetic field, wherein the electric and magnetic fields act to increase collisions between electrons in the laser medium and increase ionization of the laser medium, thereby causing a more efficient transfer of the power produced by a source of the high frequency voltage into the gas laser medium.

9. A gas laser oscillator comprising:

a) a receptacle for containing a gas laser medium;

b) at least one pair of permanent magnets disposed to be parallel to each other along opposite sides of the receptacle, with a predetermined space filled with the laser medium interposed therebetween, the permanent magnets establishing a magnetic field in the predetermined space and establishing an electric field when a high frequency voltage is applied to the permanent magnets; and c) wherein each permanent magnet has an electrically conductive surface layer formed from a non-magnetic conductive material, and further, wherein the electric and magnetic fields act to increase collisions between electrons in the laser medium and increase ionization of the laser medium, thereby causing a more efficient transfer of the power produced by a source of the high frequency voltage into the gas laser medium.

10. A RF discharge type gas laser oscillator wherein a high-frequency voltage is applied to the electrodes, comprising:

a) a receptacle for containing a gas laser medium;

b) a pair of electrodes disposed parallel to each other along opposite sides of the receptacle so that an electric field is established in a predetermined space in the receptacle which is filled with the laser medium when the high-frequency voltage is applied to the electrodes; and c) magnetic field establishing means for establishing a magnetic field intersecting a direction of the electric field established between the electrodes, wherein the electric and magnetic fields act to increase collisions between electrons in the laser medium and increase ionization of the laser medium, thereby causing a more efficient transfer of the power produced by a source of the high frequency voltage into the gas laser medium.

* * * * *